Dec. 4, 1956  L. GOLDSTEIN ET AL  2,773,245
GYRATOR METHODS AND MEANS
Filed June 18, 1951  3 Sheets-Sheet 1
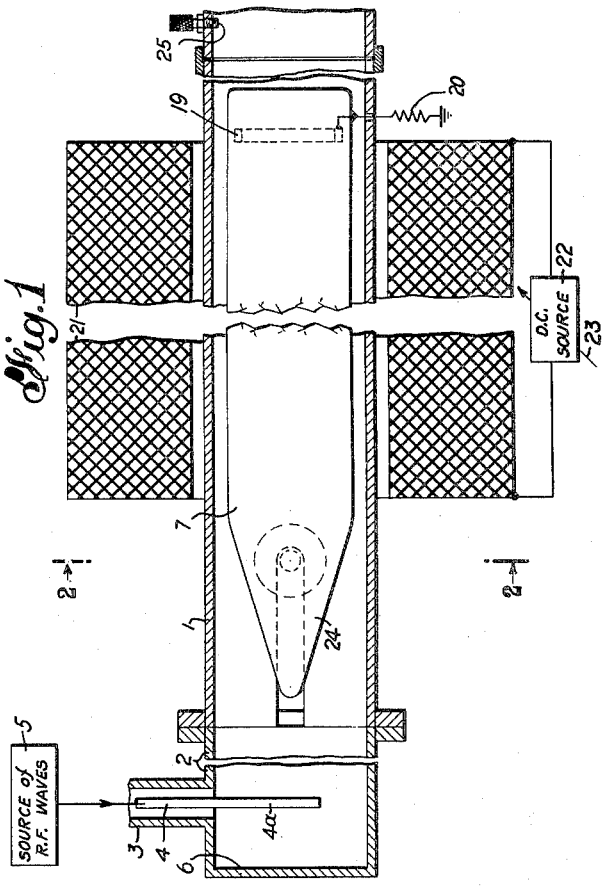
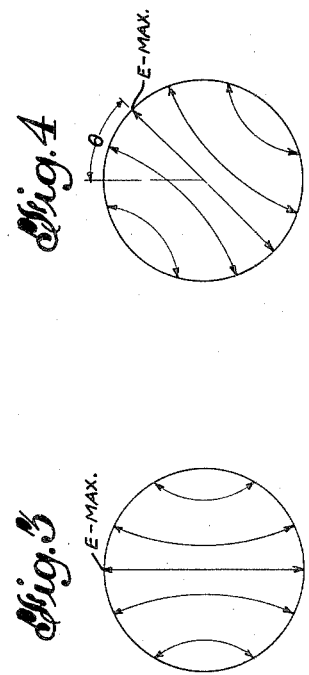
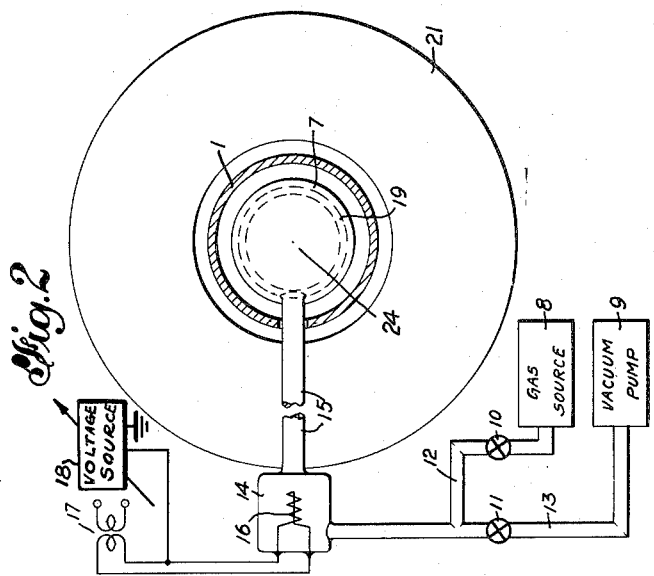
INVENTORS
LADISLAS GOLDSTEIN
MURRAY A. LAMPERT
JOHN F. HENEY
BY
*Percy P. Lantry*
ATTORNEY

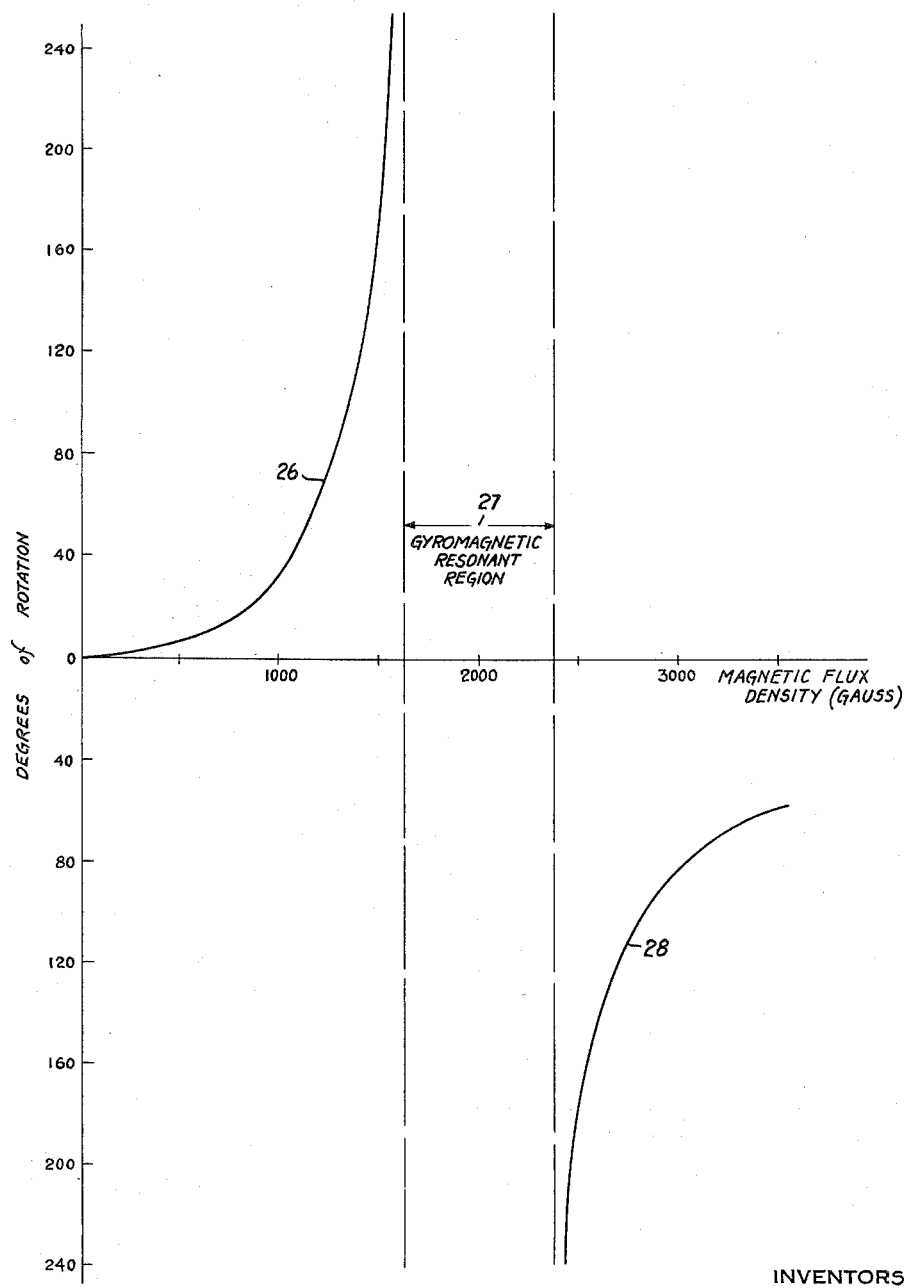

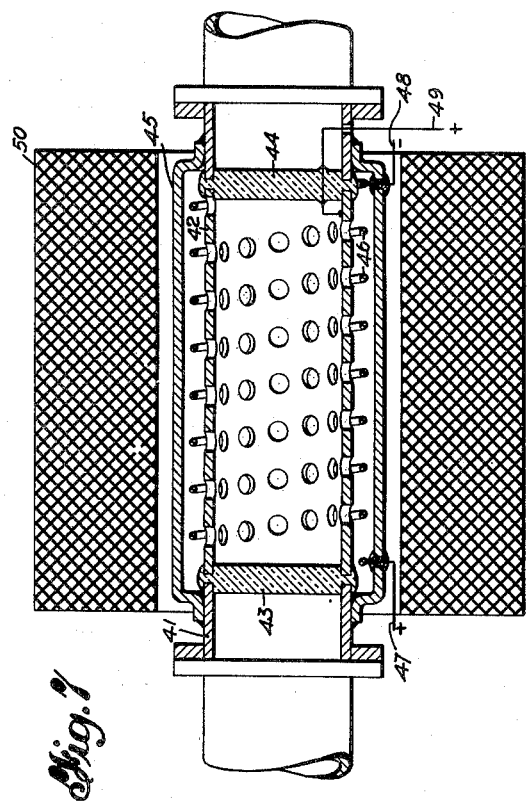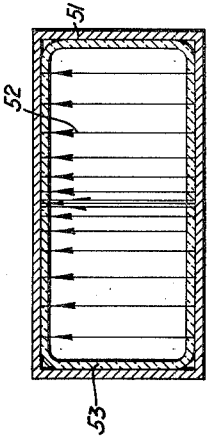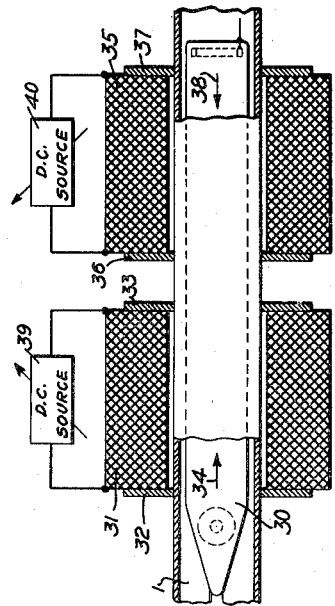

United States Patent Office 2,773,245
Patented Dec. 4, 1956

2,773,245
GYRATOR METHODS AND MEANS

Ladislas Goldstein, Weehawken, N. J., Murray A. Lampert, New York, N. Y., and John F. Heney, Clifton, N. J., assignors to International Telephone and Telegraph Corporation, a corporation of Maryland Application June 18, 1951, Serial No. 232,148

3 Claims. (Cl. 333—98)

This invention relates to radio frequency systems and more particularly to gyrator methods and means of modifying electromagnetic waves.

It is known that if a linearly polarized light wave is passed through a transparent medium which is subjected to a strong magnetic field in the direction of light propagation a rotation of the plane of polarization is obtained. The angle of rotation appears to be proportional to the length of the medium traversed by the waves and to the intensity of the magnetic field. This effect is known as the Faraday effect.

One of the objects of this invention is to provide gyrator methods and means for modifying guided electromagnetic waves. Another object is to provide gyrator methods and means for controlling the polarization, absorption and reflection of angularly-dependent electromagnetic waves in waveguides of circular or elliptical cross-section, either with smooth or periodically modified boundaries. This polarization control is obtained in a manner similar to the Faraday effect but the range of control far exceeds that obtainable at the frequencies of light waves.

Still other objects of the invention include the provision of: gyrator methods and means for producing polarization filter characteristics by passing only circularly polarized waves of a given sense of rotation; gyrator methods and means of modifying electromagnetic waves in circularly or elliptical waveguide from linearly polarized form to circularly polarized form; and methods and means for rotating the plane of polarization of a linearly polarized guided wave.

Still another object of the invention is to provide gyrator methods and means to obtain absorption and reflection of electromagnetic waves in non-circular and non-elliptical waveguides, such as square, rectangular and triangular waveguides, with either smooth or modified walls.

We have discovered that gyrator effects can be obtained from electromagnetic waves by propagating the waves through an electron gaseous medium while subjecting the medium to a magnetic field. One feature, for example, involves the use of waveguides of circular or elliptical cross-section for guiding linearly polarized electromagnetic waves. The combined effect of the gaseous medium and the magnetic field in such waveguides produces, for certain ranges of values of electron density and magnetic field intensity, an angular rotation of the plane of polarization of the wave. By "plane of polarization" we have reference to the plane of maximum E field of an angularly dependent mode. The degree of angular rotation of the plane of polarization may be controlled by varying either the electron density of the medium or the intensity of the magnetic field, or by varying both. By increasing one or both of the values of electron density and field intensity three wave transformation regions can be traversed. The first transformation region involves an angular rotation of the plane of polarization of the wave, the second transformation region involves circular polarization of the wave where the gyromagnetic frequency of the electrons in the magnetic field is approximately equal to the frequency of the electromagnetic waves, and a third transformation region involves angular rotation similar to that which occurs in the first region but opposite in sense. In the second region the wave becomes elliptically polarized and finally circularly polarized at gyro-resonance.

Another feature involves the use of non-circular waveguides, such as the rectangular form, the effects produced being high percentage reflections near gyro-resonance and high percentage absorption without reflection exactly at gyro-resonance.

From the foregoing and the following descriptions, it will be apparent that the gyrator effects and results produced in accordance with this invention exceed greatly and unexpectedly the effect obtained by Faraday with polarized light waves. Faraday worked in the frequency range of light waves and his optical control involved very very small angles of rotation, less than $10^{-4}$ degrees per wavelength. The present invention finds applications in an extremely wide frequency range, from below 100 megacycles per second to above 250,000 megacycles per second, and the angular rotation of electromagnetic waves of 90 degrees per guide wavelength are easily produced. Further, transformation to a circularly polarized wave in the gyro-resonant region is a result completely unobtainable in the experiments of Faraday. It should also be noted that all of these effects of the present invention are obtained in electronically controllable medium, namely, the electron gas or beam.

The above-mentioned and other features and objects of this invention and the manner of attaining them will become more apparent by reference to the following description taken in conjunction with the accompanying drawings, wherein:

Fig. 1 is a longitudinal sectional view of one form of gyrator device in accordance with the principles of the present invention;

Fig. 2 is a cross-sectional view taken along line 2—2 of Fig. 1;

Fig. 3 is a diagrammatical illustration of the electric field distribution for the $TE_{1,1}$ mode of wave propagation in a circular waveguide;

Fig. 4 is a view similar to Fig. 3 showing the field distribution after rotation of the plane of polarization of the wave through an angle $\theta$;

Fig. 5 is a graph of a curve showing the rotation of the plane of polarization of a linearly polarized wave plotted as a function of the magnetic field intensity;

Figs. 6 and 7 are longitudinal cross-sectional views showing two modified forms of gyrator devices; and Fig. 8 is a diagrammatical illustration of the field distribution for a rectangular form of waveguide wherein the two dimensions differ.

Referring to Figs. 1 and 2 of the drawings, the gyrator device therein shown includes a waveguide section 1, which preferably is circular.

Coupled to this section of the waveguide is an input waveguide section 2 to which is coupled a coaxial line 3, 4 which launches electromagnetic waves from source 5 into the waveguide 2 as linearly polarized waves. The section 2 includes a short 6 approximately one-quarter of a guide wavelength back of the antenna $4a$ extending from the inner conductor 4. The waves are launched by the antenna $4a$ in the linearly polarized $TE_{1,1}$ mode, the electric field distribution of which is illustrated in Fig. 3. While the $TE_{1,1}$ mode is appropriate for a circular waveguide, it should be understood that other modes having a strong angular dependence, such as the $TE_{1,2}$ mode, may also be used. The dimensions of the waveguide, of course, are determined by the frequency range of the source of waves to be propagated.

Contained in the waveguide section 1 is an envelope 7, into which gas may be introduced under controlled pressure from a source 8. A vacuum pump 9 is shown for evacuating other gases from the envelope prior to filling it with a desired gas or gas mixture. In practice, the envelope would be sealed with the desired gas contained therein. In Fig. 1 the gas source 8 and the pump 9 are connected by valves 10 and 11 and tubular connections 12 and 13 to a cathode container 14. The cathode container 14 is connected by gas tube 15 as a part of the envelope 7, the cathode being located outside of the waveguide. A "hot" cathode 16 is provided and supplied with a source of heating power from transformer 17 and an electron discharge voltage at terminals 18. The envelope 7 contains an annular anode 19 which is connected to ground through current limiting resistor 20. Where a "cold" cathode is used it may be located in the envelope portion contained within the waveguide.

Concentrically disposed about the waveguide and envelope 7 is an electromagnetic coil 21 to which a source of current is applied as indicated at 22. This source of current, which preferably is direct current, may be varied as indicated at 23 to control the magnetic field intensity. If desired the current for the coil may be alternating current or direct current pulses depending upon the effects desired. The forward portion 24 of the envelope 7 is preferably tapered to minimize wave disturbance due to boundary discontinuities.

Where the magnetic field or a part thereof is to be held at a given intensity, the field may be supplied by a permanent magnet of cylindrical or other suitable form. Also, an additional coil may be used in conjunction with the permanent magnet or other main coil.

Gyrator propagation experiments were made in a circular waveguide substantially as illustrated in Figs. 1 and 2 with a range of frequencies of 4500 to 5500 megacycles per second. The gaseous medium contained in the tube 7 was provided with a high density of free electrons by a pulsed D. C. discharge by means of the cathode 16. Any means whatever, for instance electron beams or gaseous media ionized by the passage of ionizing radiations like $\alpha$, $\beta$, and $\gamma$ rays and X-rays, may be used to produce the free-electron gas, or A. C. discharge, or gas breakdown by the passage of high frequency electromagnetic waves.

By using a rotatable probe, such as indicated at 25 following tube 7, the rotation of the plane of polarization and the degree of ellipticity of the propagated wave was measured. By moving the probe 25 through different angles, angular location of the maximum E field is easily determined. The circular waveguide used for these measurements had a cut-off frequency of 4430 megacycles per second. Measurements were taken over a range of gas pressures from 0.5 to 100 mm. Hg and at various D. C. pulse currents and voltages. The magnetic field intensities were varied up to 3500 gauss which corresponds to an electron gyromagnetic frequency far above the signal frequencies used. The electron discharge was pulsed, with a 5 microsecond pulse, and the results were measured in the decaying gas discharge plasma which was prolonged long after the electron temperature has decreased to room temperature.

The index of refraction of the plasma for microwaves is a function of the plasma frequency which is determined by the electron density, electron temperature and the collision frequency of the electrons. When the plasma is subjected to a magnetic field its index of refraction is also a function of the intensity of the magnetic field in addition to the above-mentioned variables of the plasma. Ions do not appear to play any significant part in the phenomena observed.

In Fig. 3 the field distribution in the circular guide at the input of the gyrator device is illustrated by way of example in accordance with the linearly polarized $TE_{1,1}$ mode. For a given electron density and magnetic field intensity, the plane of polarization of the wave is caused to rotate a certain angle $\theta$. Such an angular rotation is illustrated in Fig. 4. It will be understood, of course, that a magnetic field in the absence of the gas plasma would not affect wave propagation. It should also be understood that this angular rotation of the plane of polarization of the wave has reference to a linearly polarized wave and where the intensity of the magnetic field is maintained at a value sufficiently far removed from electron gyroresonance. When resonance is approached, the linearity of the polarization of the wave is lost, the wave growing into a purely circular one through different degrees of ellipticity of polarization. For values of magnetic field intensity outside the gyroresonant region, pure angular rotation is obtained without noticeable change in amplitude, because the circularly polarized waves which rotate in opposite directions are equally unaffected by passage through the anisotropic electron gas. In the gyroresonant region there is unequal absorption and reflection of these circularly polarized waves. Thus, one of the circularly polarized waves is completely attenuated in the gyromagnetic resonant region, and the other wave which rotates in the opposite direction passes through the gas plasma section with little or no attenuation. Where the magnetic field intensity values are increased beyond the gyroresonance region, angular rotation of the plane of polarization is again observed. This rotation, however, is in the opposite direction to the one which occurs below gyroresonance. This fact has been proven by experiment utilizing opposed magnetic fields, such as illustrated in the embodiment of Fig. 6. By bringing the section of the first magnetic coil to resonance, one of the waves is completely attenuated and by bringing the second coil to resonance with the field in the opposite direction, the other wave is completely attenuated. By controlling the two opposing fields in the intensity region of gyro-resonance, "magnetocrystals" for guided microwaves are thus created and controlled to simulate any desired "crystal" size and apparent transparency. For a given direction and intensity of magnetic field, the magnitude of rotation and sense of rotation for a fixed observer of the linearly polarized wave is independent of whether wave propagation is parallel or anti-parallel to the direction of the magnetic field.

In Fig. 5 a graph is shown for a specific experiment indicating the degree of rotation of the plane of polarization of the wave as the intensity of the magnetic field is varied, other conditions of the gyrator device being maintained constant. As the field intensity is increased, the curve 26 shows the angle of rotation to be a function of the magnetic field until the field intensity reaches the resonant region. The gyromagnetic region 27 varies in width in accordance with the frequency of the wave, the electron density and the electron collision frequency in the gas. As the field intensity passes beyond the resonant region, angular rotation of the plane of the polarization is again observable but this time in the reverse direction as indicated by the curve 28.

In Fig. 6 a gyrator device is shown with two electromagnetic coils disposed in opposed relation about a waveguide section containing a gas plasma as indicated by the envelope 30. The first coil 31 is disposed about the forward portion of the tube 30 and is provided with end plates 32 and 33 of magnetizable material at the ends thereof to concentrate the magnetic field uniformly axially of the tube 30 with the field direction as indicated by the arrow 34 and also to confine the magnetic field to the immediate vicinity of the coil. The second coil 35 is disposed concentrically about the rear portion of the tube 30 and is likewise provided with end plates 36 and 37, which serve like purposes as end plates 32 and 33; the directivity of the magnetic field is indicated by the arrow 38. These two coils are controlled by D. C. sources 39 and 40 each of which may be adjusted to control the intensity of the magnetic fields. As hereinbefore stated, the opposed magnetic fields in the gyromagnetic resonance region may be used to completely block the flow of the electromagnetic waves, as a switching device, or it may be used in magnetic intensity regions outside the region of gyro-resonance for modulating the waves in amplitude, phase or frequency and also for polarization control. If desired, one or both of the coils 31 or 35 may be supplemented by or replaced by a permanent magnet.

In Fig. 7, another embodiment of the gyrator device is shown utilizing an electron flow to constitute the electron gas. The device comprises a section of waveguide 41 which contains a grid-like anode 42 insulated from the section 41 by dielectric partitions 43 and 44 which also form part of the tube envelope. The anode section 42 is enclosed by an envelope 45, whereby the section may be maintained at a vacuum. Disposed between the envelope casing 45 and the grid 42 is a cathode 46. By properly applying potential across the cathode-anode combination by way of leads 47, 48 and 49, the electrons are caused to flow in hypo-cycloid-like orbits whereby a plasma of electrons is produced within the cylinder of the anode through which the electromagnetic waves must flow. Surrounding the section is an electromagnetic coil 50, whereby a magnetic field may be controlled to obtain the desired gyrator effects. The coil 50, of course, may be supplemented or replaced by a permanent magnet as desired.

In Fig. 8, a rectangular waveguide 51 is shown wherein one dimension is twice the other. The field distribution 52 is shown in accordance with the $TE_{1,0}$ mode. A dielectric tube envelope 53 contains a body of electron gas. Alternatively, the guide walls could serve this purpose. This rectangular configuration does not support circularly polarized waves, and when used in the gyrator device different phenomena are observed, that is, instead of polarization transformation, wave absorption and reflection is observed. Only small attenuation of the wave is observed until the gyromagnetic resonance region is approached, where the attenuation rises sharply to a large maximum at gyro-resonance. Where the magnetic field intensity is increased beyond gyro-resonance, the attenuation is sharply reduced. Substantial reflections are obtained immediately on either side of gyro-resonance. There are no reflections right at gyro-resonance.

More rapid operation of the device may be required than can be obtained by controlling the magnetic field intensity. In such cases, the magnetic field is maintained constant and the electron density of the gas plasma is varied. This is accomplished, for example, by applying signals, such as pulses or alternating voltage to the cathode, as indicated at 18 in Fig. 2, or to grids associated with the cathode.

With reference to propagation in guides of circular cross-section, by calibrating the rotary positions of the probe in Fig. 1, a frequency monitoring operation may be had, that is, the frequency of a linearly polarized wave may be determined by the degree of angular rotation for a given electron density and field intensity of the gyrator device. Such a meter is always "open," that is, requires no tuning for an indication of signal. A mode filter action also may be had at or near gyromagnetic resonance in that it allows a circular polarization of one sense of rotation only to propagate through the anisotropic electron gaseous medium.

The waveguide section of the gyrator device may either have fast or slow wave propagating characteristics and may either be closed or open. For fast propagation the guide should have smooth boundaries, although they may be ridged. For slow propagation the walls may be modified in many respects, for example, the guide may be periodically corrugated or provided with helical, foraminous or grid-like walls, or the walls may be partially or completely coated with dielectric material, and if desired, the dielectric material may be arranged as a composite dielectric within the guide.

The length of the electron gas plasma may be widely varied depending on the magnitude of the effect desired. Roughly speaking, the magnitude of a gyration effect will be proportional to the length of anisotropic electron gas medium (if the effect is measured in the proper units, such as decibels for attenuation). For some applications very short lengths of electron gas will be adequate or desirable, less than one-quarter guide wavelength. For others, at least one guide wavelength of electron gas will be desirable.

Where a cold cathode is employed in the magnetic field as a means of producing the electron gaseous medium, the device may be used as a switch or modulator. This is accomplished by the "shutter action" of the longitudinal magnetic field on production of an electron gas distribution cross-wise of the guide. By modulating this electron density, phase or amplitude modulation of the electromagnetic waves is performed. This modulation, however, may be obtained by variation of either the electron density or the field intensity or both.

While we have described above the principles of our invention in connection with specific apparatus, it is to be clearly understood that this description is made by way of example only and not as a limitation to the scope of our invention, as set forth in the objects thereof and in the accompanying claims.

We claim:

1. A method for rotating the polarization of a plane-polarized wave propagated in a waveguide structure and for maintaining the attenuation at a low value, said waveguide structure having an ionizable body of a gaseous medium therein and means for establishing a magnetic field having a major component substantially parallel to the longitudinal axis of said waveguide disposed thereabout to interact with the electrons of said gaseous medium, comprising propagating a guided electromagnetic wave having a given signal frequency within said waveguide, maintaining said magnetic field at an intensity which establishes an electron gyromagnetic frequency within said gaseous medium above the signal frequency of said propagated wave, and pulsing the ionization thereof to establish a decaying gas discharge plasma within said gaseous medium whereby the electric field of said electromagnetic wave interacts with the electrons of the decaying gas discharge plasma, the duration of said decaying gas discharge plasma being prolonged for a period of time so that its electron temperature is decreased to substantially that of the un-ionized gas.

2. A method according to claim 1, wherein said means to produce said magnetic field comprises two separately energizable magnetic coils longitudinally spaced along the waveguide in noncoupled relation to one another.

3. A gas discharge gyrator device for controlling the absorption and reflection of guided electromagnetic waves propagated in a rectangular waveguide structure, comprising a waveguide having a rectangular cross section, a body of a substantially electrically neutral ionized gaseous medium composed of substantially equal numbers of positive and negative particles contained within said waveguide structure, means to produce a magnetic field having a major component substantially parallel to the longitudinal axis of said waveguide, said magnetic field means being disposed about said gaseous medium to influence the orbits of electrons therein, and means to propagate an electromagnetic wave through said waveguide according to a mode of propagation which has an electric field having a distribution with respect to the boundaries of said waveguide and positionally fixed with respect thereto whereby the electric field of the electrons of said gaseous medium interacts with the electric field of the propagated wave to control the propagation characteristics thereof, said waveguide structure serving to continuously constrain said propagated wave to said given mode of propagation.

References Cited in the file of this patent

UNITED STATES PATENTS 1,742,115    Whittaker _____ Dec. 31, 1929

(Other references on following page)

UNITED STATES PATENTS

| | | |
|---|---|---|
| 2,051,537 | Wolff | Aug. 18, 1936 |
| 2,257,783 | Bowen | Oct. 7, 1941 |
| 2,402,184 | Samuel | June 18, 1946 |
| 2,505,240 | Gorn | Apr. 25, 1950 |
| 2,535,793 | Hansell | Dec. 26, 1950 |
| 2,578,434 | Lindenblad | Dec. 11, 1951 |
| 2,644,930 | Luhrs | July 7, 1953 |

OTHER REFERENCES

Yager and Bozorth: "Ferromagnetic Resonance at Microwave Frequencies," Physical Review, vol. 72, No. I, 3rd series, pages 80 and 81. Copy in the Patent Office Library.